April 6, 1948. R. T. BOWEN ET AL 2,438,896
MULTIPLE PRESS LOADING AND/OR UNLOADING APPARATUS
Filed Aug. 5, 1942 5 Sheets-Sheet 3

R. TATE BOWEN.
ADAM W. HEAD.
FRANK G. LESNIAK.
INVENTORS

BY *H. H. Dyke*
ATTORNEY

April 6, 1948.                R. T. BOWEN ET AL                    2,438,896
            MULTIPLE PRESS LOADING AND/OR UNLOADING APPARATUS
                        Filed Aug. 5, 1942           5 Sheets-Sheet 4

R. TATE BOWEN.
ADAM W. HEAD.
FRANK G. LESNIAK.
INVENTORS

BY  *H. H. Dyke*
        ATTORNEY

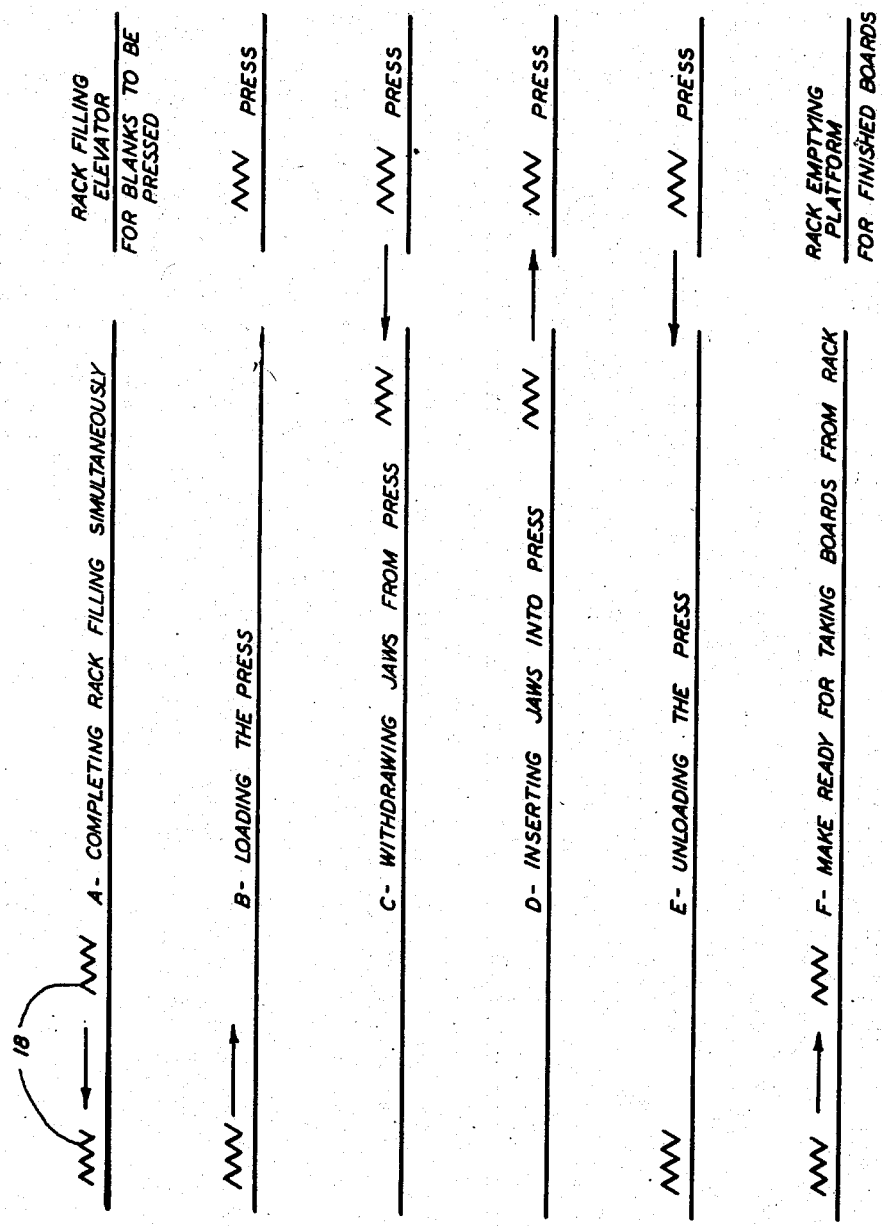

Patented Apr. 6, 1948

2,438,896

UNITED STATES PATENT OFFICE 2,438,896

MULTIPLE PRESS LOADING AND/OR UNLOADING APPARATUS

Rees Tate Bowen, Adam W. Head, and Frank G. Lesniak, Laurel, Miss., assignors to Masonite Corporation, Laurel, Miss., a corporation of Delaware Application August 5, 1942, Serial No. 453,698

12 Claims. (Cl. 214—1)

The invention relates to an improvement in apparatus for the simultaneous loading of multiple platen hydraulic presses with sheets to be pressed and simultaneous unloading of the pressed sheets therefrom.

The invention is particularly applicable to the simultaneous mechanical handling into interplaten press spaces of plural sheets having sufficient strength to be self-supporting, and to the simultaneous gripping and removal of the completed sheets which have of course been increased in strength and stiffness by the pressing operation. It is well adapted, for example, for use in the manufacture of boards of ligno-cellulose fiber made according to U. S. Patent 2,120,137 to W. H. Mason, such boards being made from self-supporting blanks and having smooth surfaces at each face after pressing by reason of being pressed directly against the press platens or against surface plates applied to the platens.

Such self-supporting sheets or blanks to be pressed can be simultaneously introduced into the press interspaces by pushing them from behind, but difficulties are encountered in connection with the simultaneous removal of the boards after being pressed. When the press is opened the pressed boards lie flat upon the under platen or surface plate. Lying thus they cannot be readily gripped by their edges. The invention provides lifting means in association with means for gripping the pressed boards by their edges. The lifting means serve to raise portions of the board, preferably the corner portions of one end thereof, away from the press platen or surface sheet so as to permit access thereto of the gripping means. Upon such portions being lifted away from the platen or plate, the gripping means are operated to grip the plural boards by their lifted edges. Then by effecting a translatory movement of the gripping means, the completed boards are simultaneously unloaded from the press.

While apparatus has heretofore been known and used for simultaneous loading and simultaneous unloading of multiple platen presses, the pressing has been done with use of conveying means which underlie the sheet in the press and are thus available to assist in the removal of the completed board after pressing. Such devices are not adapted for the handling into and out of the press of self-supporting boards, particularly boards smooth on both sides which after pressing lie flat directly upon the press platens or surface plates. Consequently with use of such self-supporting blanks manual loading of the sheets or blanks into the press singly, or one sheet at a time, and the like manual unloading of the pressed boards singly from the press, has been customary practice. By the use of the apparatus of the present invention such manual and single loading of self-supporting blanks and unloading of the boards made therefrom is replaced by simultaneous mechanical loading and simultaneous unloading, and much saving of time and numerous other advantages obtained.

It is therefore an object of this invention to speed up the production of fiber board products made from self-supporting blanks by delivering the several sheet articles simultaneously into and out of the press platen openings.

Such single manual press loading is usually commenced at the bottom press opening and carried on progressively to the top. These operations are not only relatively slow, but result in exposing the blanks to the press platen heat for varying periods of time, which is not compatible with securing the greatest uniformity of product. The platen temperature for the hot-press manufacture of fiber boards with two smooth surfaces is quite high, as for example over 200° C., and for this reason it becomes important in the manufacture of such boards to effect simultaneous loading of all blanks into the press and so avoid uneven heating of the blanks. While manual unloading can proceed more rapidly than loading, the same objections apply to some extent to unloading of the hot-pressed sheets manually and singly, and such objections are obviated by simultaneous unloading. It is thus an object of the invention to secure uniformly good board products made from self-supporting sheets by avoiding uneven exposure of the sheets to high temperatures.

In manual loading and unloading operations, some damage, such as breaking of the sheet, due to handling difficulties, was not preventable. An object of this invention is to prevent, by the use of mechanical apparatus, damage to fiber board sheets.

It is a further object of this invention to prevent or reduce the necessity for manual alignment of the sheets within the press platen interspaces preparatory to pressing. Further objects of the invention will be obvious to those skilled in the art in connection with the description of the apparatus selected for the purpose of illustration.

The preferred apparatus of the invention comprises a rack so constructed as to provide a plurality of compartments one over another, each compartment being capable of receiving and supporting one of the sheets of the material to be pressed. The compartment spacings are the same as the normal open spacings between platens of the hydraulic press in which the sheets are to be pressed. Thus upon the rack being moved, as on a track or the like, into position in front of an opened, multiple-platen press, the rack compartments are each in substantially horizontal alignment with one of the openings between press platens. Projectible means associated with each of the several rack compartments are provided for extending from the compartments into the press spaces, and these means serve when the press is to be unloaded for gripping the boards by the side edge parts adjacent to the corners so that they may be pulled out of the press and into the rack.

Each gripping mechanism is also equipped with a shoulder or stop which may engage the end of the sheet, thus providing means for loading the press by pushing the sheet material out of the rack compartments and into the press openings. The pusher means and gripping means for all rack compartments are actuated simultaneously by a single main carriage member mounted in the rack for lengthwise travel therein. Thus the movement of the entire load of blanks or boards for loading and unloading the press takes place simultaneously. The carriage and grippers are also preferably made use of in connection with the preliminary placing of the blank sheets in the rack, and also in connection with the final discharging of the pressed boards from the rack.

The structure and purpose of the present invention may be more easily understood from the following description of the preferred embodiment shown in the accompanying drawings, in which Fig. 1 is a diagrammatic horizontal sectional view, through section B—B of Fig. 3, of a rack, showing a blank in course of delivery to the rack from a rack-loading elevator;

Fig. 9 is a diagrammatic showing of operations performed with use of loading racks.

Figure 1:
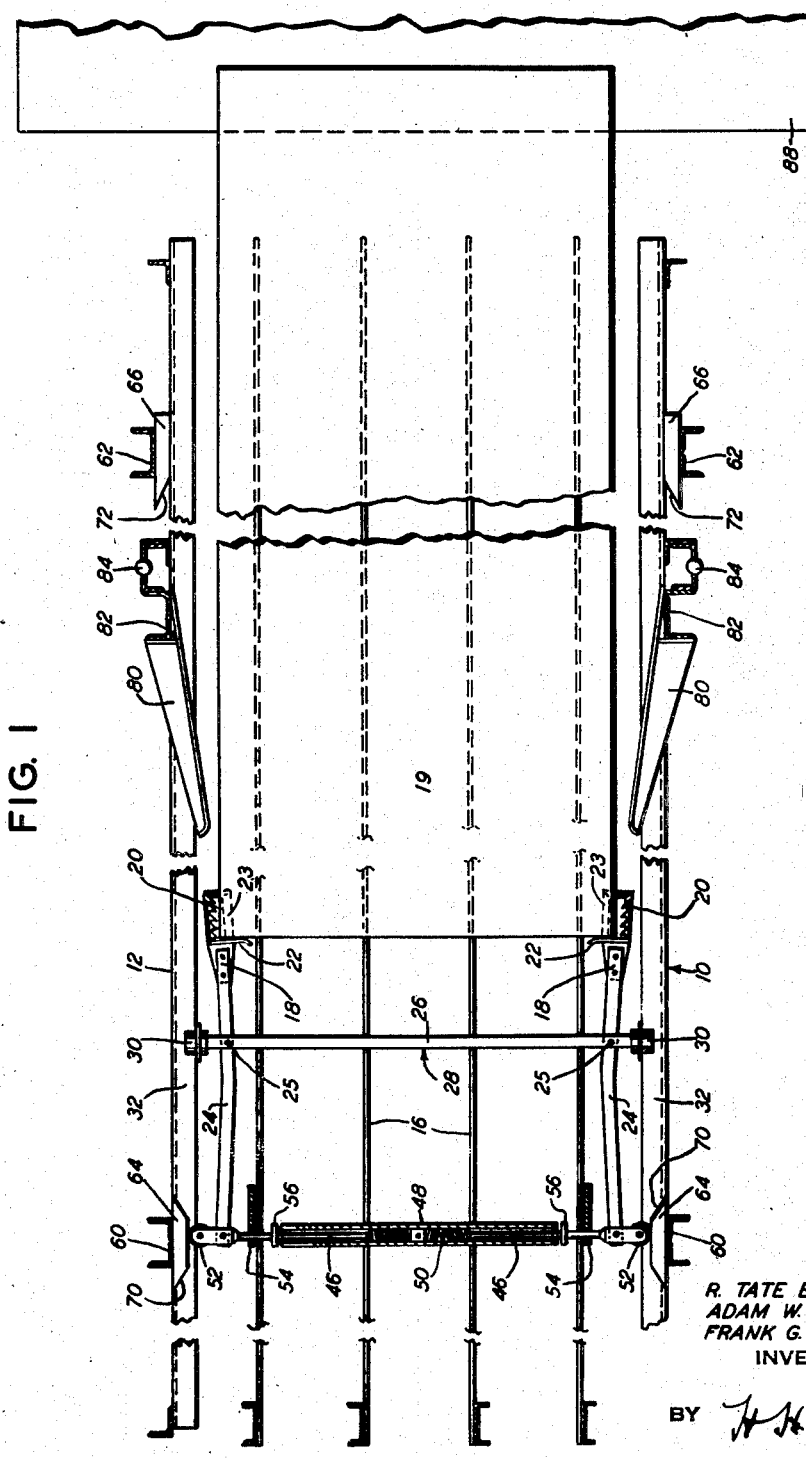

The rack in its preferred form is designated by the reference character 10, and reference character 12 is applied to designate the rack frame. Said frame 12 is divided into a plurality of compartments 14 by means of longitudinally extending board-supporting grill-like bars 16. The compartments 14 so provided are disposed in substantially vertical alignment one over another, and the filling of the rack is effected by the introduction of a single sheet into each of said compartments.

Received within or extending from each compartment 14 is a pair of gripping jaw members 18. The members 18 are provided with teeth 20 which extend inwardly from each of said members 18 and are adapted to grip the board 19 by its edges. The members 18 are also provided with pusher or stop members 22 which serve for pushing the blank into the press and also for positioning the blank by its corners with respect to the gripping teeth 20. These gripping members 18 terminate at their forward ends in downwardly sloped knife-edged portions 23 adapted to be inserted under the board to lift the edge thereof and thus enable the gripping members to grip the board.

Said members 18 are arranged so that they can work within compartments 14 or project therefrom, and for this purpose they are mounted on longitudinally extending lever bars 24, 24. About midlength of these lever bar members 24, they are horizontally pivoted at 25 to axles 26 which, with bars 24, form the fore-carriages 28. Axles 26 are provided with flanged wheels 30, 30 which run and are guided on the longitudinally extending angle bars 32, 32 forming a portion of the rack frame.

In addition to riding on the fore-carriages, of which one is provided for each pair of gripping mechanisms and for each compartment, lever bars 24, 24 and jaw members 18 carried thereby are arranged for simultaneous movement to and fro in the rack by their connection with a main carriage 34 which extends the full height of the rack 10 and has guide wheels 36 which run between lower and upper tracks 38, 38 in the rack. Said main carriage 34 is actuated by means of the pairs of endless chains 40, 40 which are driven to travel in unison by means of the sprocket driving chains 44, 44 from a source of power indicated at 45, and control arrangements (not shown) are provided so that the attendant can cause the main carriage 34 to be moved and stopped whenever desired. The main carriage and the chains are connected by means of locking pins fastened to the chains and slidably mounted in slots 40a of the main carrier bar.

The ends of pivoted lever bars 24, 24 opposite the end thereof carrying the gripping jaws are arranged for controlled movement toward and away from one another and thereby actuating the gripping jaws. The connections by which such control is effected consist of pusher rods 46, 46 having bar portions at their inner ends extending into the sleeve 48 and receiving therebetween an expansion spring 50 by which they are forced outwardly. Said members 46 are enlarged and split at their outer portions to pivotally receive the ends of said lever bar members 24 and also the end rollers 52, 52 which cooperate with cam means to be later referred to.

The gripping mechanisms for each of the compartments is connected to the main carriage 34 to travel therewith by all the pusher rods 46, 46 being received in openings provided therefor in the upright members 54, 54 of the main carriage 34. Collars 56, 56 on the rods 46 engage members 54 and thereby serve to limit the outward movement of lever bars 24 caused by springs 50. It will be seen that when inward push is applied to rods 46 by devices acting on rollers 52, and spring 50 is thus compressed, the jaws 18 will be opened and the blank or board released. Also it will be seen that spring 50 when free to expand will produce a closing or clamping movement of toothed jaws 18 upon the blanks or boards.

The cam means shown for actuating the lever bars and grippers comprise the vertical cam supporting bars 60, 60 and 62, 62 at each side of the rack and inwardly extending cams 64, 66 thereon. These cams are adapted, when the cam supporting bars are moved inwardly, to extend into the compartments 14 where they may be engaged by rollers 52.

Cams 64 at the region farthest from that end of the rack 10 which may register with the press 68 have inclined camming surfaces 70, 70 at each end thereof so that rollers 52 may engage therewith when approaching members 64 from either side. Rollers 52 engage the cams 66 located near the opposite end of the rack when approaching same from one side only so that said cams 66 have only the single inclined camming surfaces 72.

Cam supporting bars 60 and 62 are actuated to move in parallelism toward and away from each other by the double-acting hydraulic cylinders 74, 76, said bars 60, 62 being mounted for such purpose as here shown on links 78.

Control arrangements (not shown) are provided whereby the attendant can regulate the compressed air supply to cylinders 74, 76 so as to force the cam supporting bars 60, 62, and the cams 64, 66 carried thereby. into in or out positions as desired.

In each of the compartments 14 guides 80 are provided for guiding the sheet by its edges into position for entering the clamping jaws 18. These guides 80 are secured to the bar 82 hinged to the rack-frame 12 at 84. For turning this hinged bar 82 and thereby moving the guides 80 into in or out position, hydraulic cylinders 86 are provided, also of the double-acting type, and also provided with controls (not shown) arranged to permit the attendant to cause the guides to be forced inwardly to serve for guiding the sheets, or outwardly where they will be out of the way, by regulation of the compressed air supply.

In use the rack 10 is initially stationed in front of the loading elevator 88 (Fig. 1). In charging the rack with blank sheets, the gripping mechanisms 18 are moved to a position within the rack as illustrated in Fig. 1. The jaws 18 are then forced away from each other, or into the open position, as by the attendant bringing the cam supporting bar 60 and cams 64 to innermost position as shown. The semi-rigid sheets 19 are now charged into the several rack compartments 14 by hand, the sheets sliding along supporting bar grills 16 until they pass between the open jaws 20 and are stopped by jaw stops 22, as illustrated in Fig. 1. The sheets 19 are guided in place by the guide members 80, 80, which the attendant has previously brought to innermost position, as shown in Fig. 1. When all the sheets 19 have been so charged into the rack compartments, the jaws 18 are closed to grip the sheets, as by the attendant operating the cam supporting bars 60 to separate same and permit the springs 48 to actuate the jaws 20 to grip the sheets therebetween by the sheet edges. When this has been done, the sheets can be moved bodily by imparting movement to the main carriage 34. Said carriage is now retracted to simultaneously draw all the sheets sufficiently far into the rack compartments so that the whole length of the sheets rests within the rack, and the charging of the rack is now complete.

Figure 8:
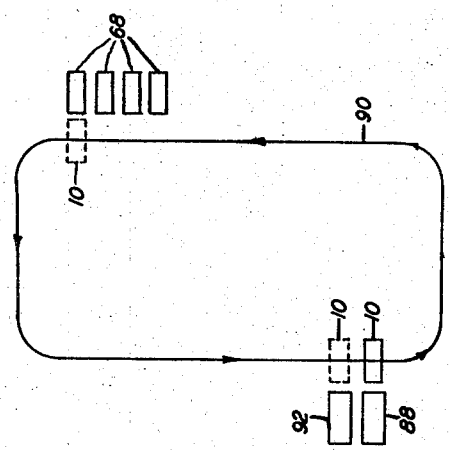
Fig. 8 is a schematic diagram of a layout of the various machines in a multi-press equipment.
Figure 5:
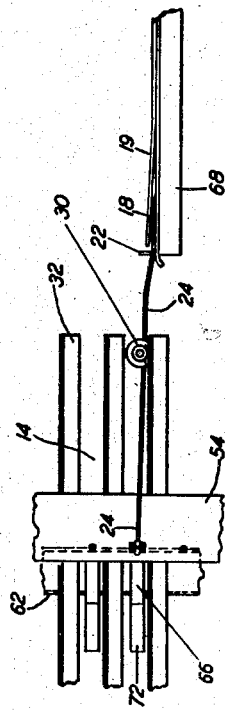
Fig. 5 is a fragmentary side elevation of a portion of the rack and the gripping mechanism, and shows the gripping mechanism extending into the press.
Figures 6, 7:
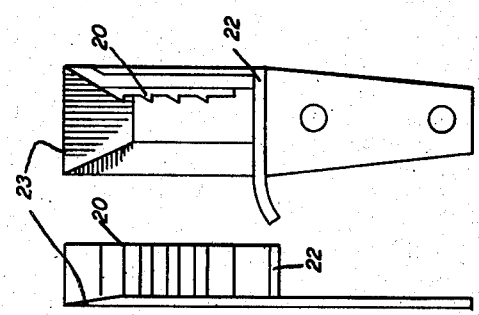
Fig. 6 is a plan view of a jaw of a gripping mechanism.
Fig. 7 is a side view of Fig. 6.
Figure 4:
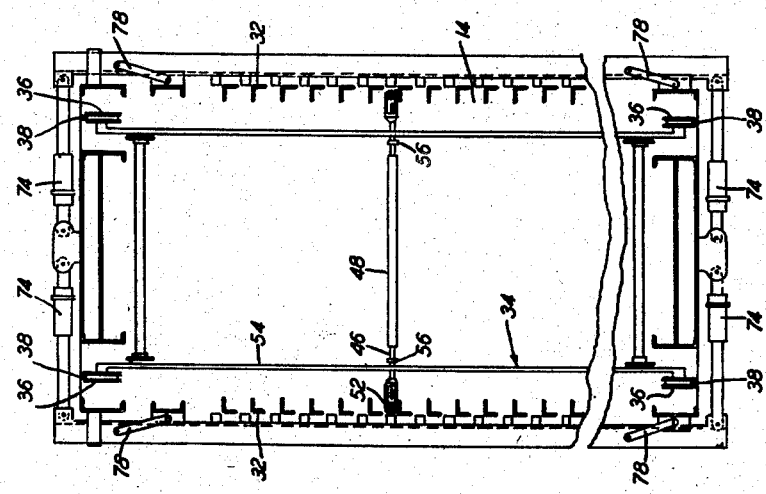
Fig. 4 is a vertical section substantially through broken line A—A of Fig. 3.

The rack containing this load of sheets is then moved along guide rail 90 until it is in position in front of press 68, as shown in dotted lines in Fig. 8. Guides 80 are moved away from each other to such an extent that they will not interfere with the movement of wheels 30 on track 32 during the operation of loading the press. At the same time cam supporting bars 62 are moved toward each other, thus simultaneously inserting the sloped edge cams 66 into the path of rollers 52 in compartments 14.

Figure 2:
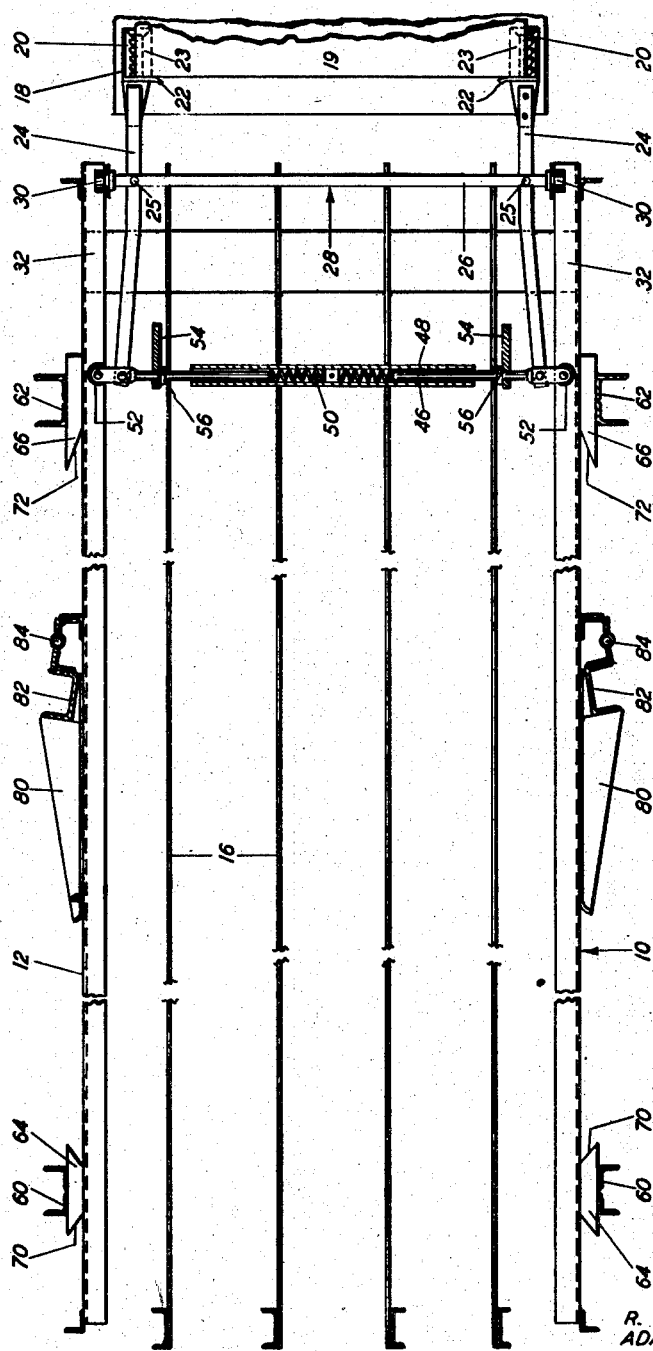
Fig. 2 is a view similar to Fig. 1 and showing a board after delivery to the press from the rack.
Figure 3:
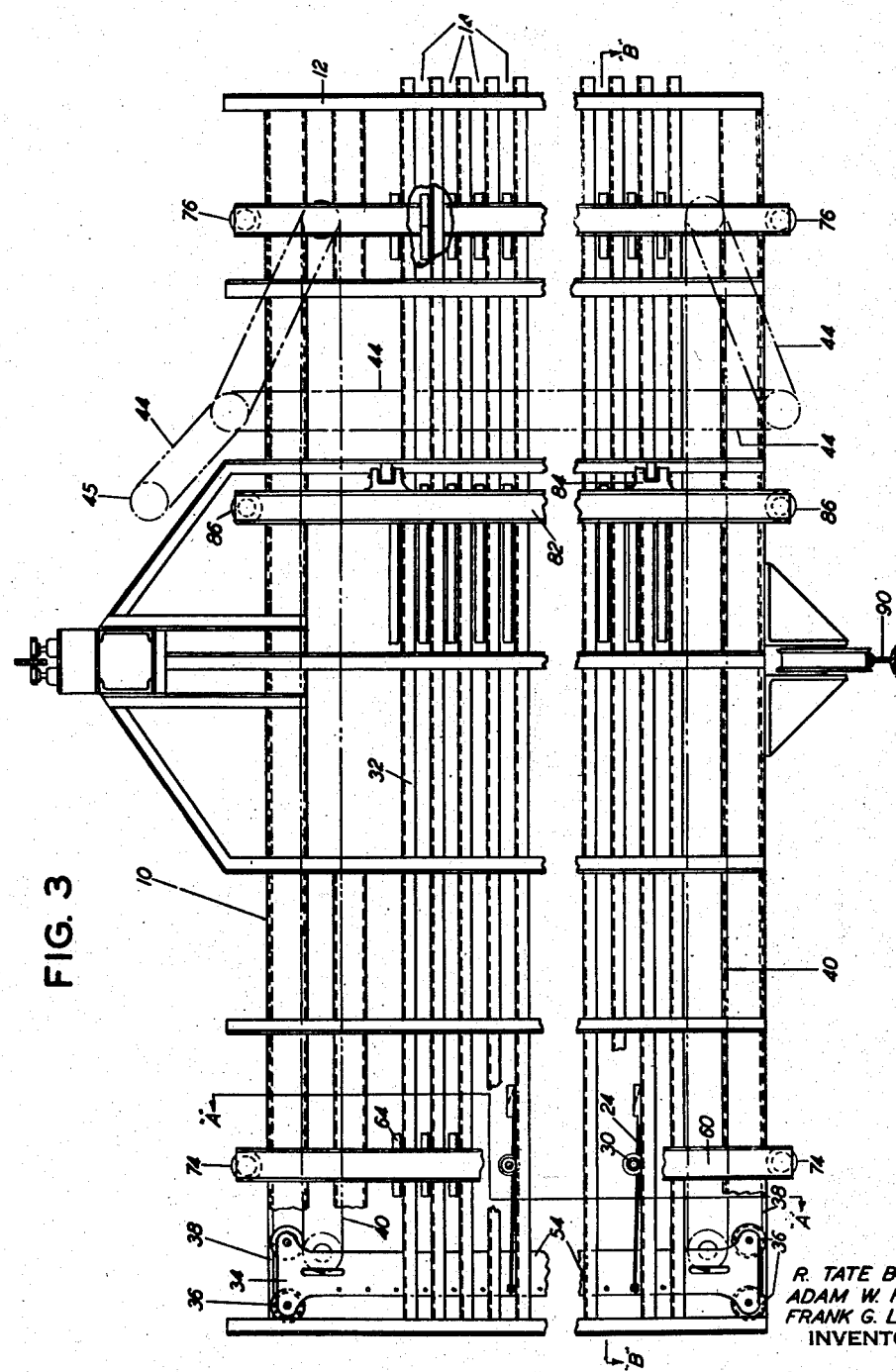
Fig. 3 is a diagrammatic side elevation of a rack.

To load the press which is in open position, main carriage 34 is now travelled toward the press-end of the rack, and through this action the sheets 19 are pushed by the jaw stops 22 out of the rack compartments and into the aligned press platen openings, as shown in Fig. 2. During the movement of the sheets from the rack into the press, the end rollers 52 travel over the sloped edges 72 on to the cams 66, thus releasing the gripping action of the jaws on the sheets. The sheets are now free and rest entirely within the press platen openings as shown in Fig. 2. The carriage 34 is then moved in the opposite direction and the jaws are thereby withdrawn from the press platen openings so that the press may be closed.

The rack may remain in place before the press during the pressing operation if desired. Assuming this to be the case, after the pressing cycle has been completed and the press has been opened, the carriage and gripping mechanisms are again moved toward the press, and the gripping jaws enter the press spaces. During this movement toward the press, rollers 52 again travel over the sloped edges 72 and onto the flat portions of cams 66, which projections are in the "in" position, thus compressing springs 50 and causing the jaws of the gripping mechanism 18 to open. During this movement of the jaws into the press, the knife edges 23 of the jaws enter between the sheets 19 and the lower press platen or surface plate, thereby lifting the edges of the pressed sheet. The movement of the jaws into the press is continued preferably until the end of the sheet 19 is abutted by the jaw stops 22, and the side edge portions of the sheet 19 will then rest between the jaws. Vertical cam supporting bars 62 are now actuated by means of the hydraulic cylinders 76, 76 so that the cams 66 move away from each other. Through this action the jaws of the gripping mechanism 18 are actuated to their normal closing position by springs 50 and firmly grasp the sheets 19 between them. That the gripping of the sheets is effected by the springs is of advantage by compensating for slight variations in sheet width and in that the laterally applied gripping pressure is to some extent yielding and injury to the board edges can be avoided. The several gripping mechanisms together with the pressed boards are now moved into the rack compartments simultaneously by causing the main carriage 34 and pressed boards to be retracted to the extreme opposite end of the rack. In this way the press is unloaded and the load of pressed boards is transferred into the rack.

The rack containing the load of pressed sheets is now moved away from the press 68 along guide rail 90 (Fig. 8), preferably to a cooling station (not shown), and then to an unloading platform 92 from which the pressed boards can be taken for trimming and other operations and shipment. Provision is preferably made to simultaneously push the boards a little way out of the rack so that they are conveniently located for removal by hand and free from the grippers. For this purpose cam suporting bars 60 are actuated to force the cams 64 toward each other and into the several compartments 14. The gripping mechanisms 18 which still grasp the boards 19 are then simultaneously moved by carriage 34 toward the unloading elevator until rollers 52 roll over the sloped edge portion 70 onto the flat surface of cams 64, thus causing the jaws of the gripping mechanisms to be actuated to their open position, and releasing the gripping action on the boards. Upon moving the carriage and gripping mechanisms into this position and stopping it, the boards will project from the rack somewhat so as to be readily accessible, and are then removed manually from the rack onto the unloading elevator.

Fig. 9 shows the functions and relative positions of the sheet-gripping and pushing apparatus of the present invention throughout the various steps, as A, B, C, D, E, F, of a complete cycle of manufacture. The serrated lines in such figure represent the initial and secondary positions of the jaw members for each step. The arrows show the direction of jaw member movement, and the space between serrations indicates the relative distance through which the jaw members have been moved.

A represents the step of placing the blank sheets in the rack. The sheets are manually pushed into the compartments to the position indicated as the initial jaw position. The jaw members are then used to pull all the sheets simultaneously the rest of the way into the rack.

B represents the step of loading the sheets into the press platen openings by pushing action.

C represents the idle withdrawal of the jaw members from the press platen openings.

D represents the step of reinserting the jaw members into the press platen openings, in which step the knife edges slide underneath the sheets lifting them.

E represents the step of unloading the pressed boards from the press platen openings, and running them into the rack compartments.

F represents the step of pushing the boards part way out of the rack where they are conveniently placed for removal.

Having thus described our invention and the preferable operation of our novel apparatus for simultaneous loading and/or unloading of multi-platen presses, it will be apparent that all of the sheets will be in the press for the same length of time. Furthermore, through the means of the present invention, any overheating of individual sheet material members will be precluded by the simultaneous mechanical loading and/or unloading of a multiplicity of such sheets into and/or out of multiple platen presses. It will similarly be obvious that production of the pressed boards will be speeded up by the application of our novel apparatus. Furthermore although the sheets lie directly on the platens or surface plates during pressing, means is provided for lifting up parts of the pressed sheets so that they can be gripped by the lifted edges and the press unloaded mechanically.

Although the preferred embodiment of the invention is described herein, it is understood that other modifications in the construction of the apparatus, such as substituting, for example, other gripping members for the gripping device described, may be made if so desired. However, all such modifications shall be understood to be included within the scope of the invention, and the foregoing description shall be construed as a limitation only in so far as defined by the claims.

We claim:

1. An apparatus for loading and unloading multi-platen presses with sheets, comprising a rack containing a multiplicity of compartments and a pair of sheet gripping members associated with each compartment and movably mounted therein, said gripping members of all compartments being connected and adapted to be moved simultaneously within the limits of the compartments and therebeyond, and movable means mounted on the rack to simultaneously actuate the gripping members of each compartment away from each other.

2. An apparatus for loading and unloading multi-platen presses with sheets, comprising a rack containing a multiplicity of compartments, movable cam bars, and movable guiding members, sheet gripping members mounted on a movable carriage associated with each compartment, said carriages being mounted to travel horizontally within the limits of each compartment, the gripping members adapted to be simultaneously actuated by a plurality of the movable cam bars, and the guiding members adapted to be actuated into and away from the compartments by movable bars connected to the rack.

3. An apparatus for loading and unloading multi-platen presses with sheets, comprising a rack containing a multiplicity of compartments, movable cam bars and movable sheet guiding members, sheet gripping members, including gripping teeth, pusher members and sloped edge jaw portions, mounted on a movable carriage associated with each compartment, said carriages being mounted to travel horizontally within the limits of each compartment, the gripping members of each compartment adapted to be simultaneously actuated through pivoted linkages by a plurality of the movable cam bars, the guiding members adapted to be simultaneously actuated into and away from the compartments in a substantially horizontal plane by movable bars pivotally connected to the rack, and means to simultaneously move the gripping members of the compartments horizontally back and forth within the limits of the compartments and therebeyond.

4. An apparatus for loading and unloading multi-platen presses with sheets, comprising a rack frame having a plurality of compartments and movable bars supporting sheet-guiding members at opposite sides of each compartment, said guiding members adapted to be simultaneously actuated by the bars in a substantially horizontal plane into and away from the compartments.

5. An apparatus for loading and unloading multi-platen presses with sheets, comprising a rack containing a multiplicity of compartments, movable cam bars, and movable sheet guiding members, sheet gripping members mounted on a movable carriage associated with each compartment, said carriages being mounted to simultaneously travel horizontally within the limits of said compartments, and the sheet gripping members adapted to be simultaneously actuated by the cam bars through pivoted linkages, said sheet-guiding members adapted to be moved into and away from each compartment.

6. An apparatus for loading and unloading multi-platen presses with sheets, comprising a rack containing a multiplicity of compartments and sheet guiding members at opposite sides of each compartment, sheet gripping members associated with each compartment, movable cam means mounted on the rack for simultaneously actuating the sheet gripping members, movable bars mounted on the rack to support and to simultaneously actuate the sheet guiding members, movable carriages supporting the gripping members, and movable means to simultaneously move the movable carriages horizontally within the limits of said compartments.

7. An apparatus for loading and unloading multi-platen presses with sheets, comprising a rack containing a multiplicity of compartments, sheet gripping members associated with each compartment, and sheet guiding members mounted at opposite sides of each compartment, spring means operating in each compartment through pivoted connections adapted to move the gripping members toward each other, cam means operating through pivoted linkages adapted to simultaneously spread the gripping members, hinged elements mounted on the rack for simultaneously actuating the guiding members, movable carriages in each compartment supporting the gripping members, and movable means to simultaneously move the movable carriages horizontally within the limits of said compartments.

8. An apparatus for loading and unloading multi-platen presses with sheets, comprising a rack containing a multiplicity of compartments, movable sheet gripping members mounted on movable carriages associated with each compartment, said carriages adapted to travel horizontally within the limits of said compartments, spring means mounted in each compartment and operating through pivoted linkages adapted to move the gripping members toward each other to grip the sheets, and cam means mounted on the rack and operating through pivoted linkages adapted to move the gripping members away from each other.

9. An apparatus for loading a multiple platen press with sheets which are at least semi-rigid and unloading the sheets after pressing, comprising a rack provided with compartments adapted to substantially register with interplaten spaces of the press when open, gripping jaws adapted to grip the sheets by inward lateral pressure applied to opposite edges thereof there being one pair of such gripping jaws for each compartment, travelling means in each compartment whereby the gripping jaws can be given translatory movement throughout substantially the entire length of the rack and extend therebeyond into the interplaten press spaces whereby the pressed sheet can be withdrawn from the press into the rack, and pushing means associated with the jaws and serving when the jaws are moved toward the press to insert sheets from the rack compartments into the press spaces for loading the press.

10. An apparatus for loading and unloading a multiple platen press with sheets which are at least semi-rigid and unloading the sheets after pressing, comprising a series of horizontally extending compartments disposed in substantially vertical alignment with each other, spring actuated means associated with each compartment to clamp a sheet by its side edges, movable cams mounted on the rack and operating through pivoted linkages adapted to release the gripping members, and travelling means supporting said spring actuated means, whereby said spring means can be given translatory movement throughout each compartment.

11. An apparatus for loading and unloading a multiple platen press with sheets which are at least semi-rigid and unloading the sheets after pressing comprising a series of horizontally extending compartments disposed in substantially vertical alignment with each other, spring actuated clamping means associated with each compartment and provided with teeth to clamp a sheet by its side edges, movable cams mounted on the rack and operating through pivoted linkages adapted to release the gripping members, and travelling means supporting said clamping means, whereby said clamping means can be given translatory movement throughout each compartment.

12. A movable apparatus for loading a multiple platen press with sheets which are at least semi-rigid, comprising a rack including a series of horizontally extending supporting means for supporting a plurality of sheets at successive heights in substantially vertical alignment with each other, each supporting means being of grill-like structure to provide an opening extending the height and length of the rack, sheet pusher members for each sheet mounted on roller supports which are movable within the limits of the rack, a movable main carriage positioned within the rack and including an upright member serving as a pusher bar and extending through said opening provided through the supporting means for simultaneously imparting translatory movement to the sheet pusher members as the main carriage is moved back and forth within the rack, said rack being mounted on means for movement along a guide rail.

R. TATE BOWEN.
ADAM W. HEAD.
FRANK G. LESNIAK.

REFERENCES CITED

The following references are of record in the file of this patent:

UNITED STATES PATENTS

| Number | Name | Date |
|---|---|---|
| 1,029,681 | Haight | June 18, 1912 |
| 1,218,418 | Kusterer et al. | Mar. 6, 1917 |
| 1,449,668 | Grammer | Mar. 27, 1923 |
| 1,491,384 | Eidmann | Apr. 22, 1924 |
| 1,504,256 | Marcuson | Aug. 12, 1924 |
| 1,550,907 | Lacke | Aug. 25, 1925 |
| 1,606,477 | McClelland | Nov. 9, 1926 |
| 1,759,005 | Fuller | May 20, 1930 |
| 1,779,210 | Davis | Oct. 21, 1930 |
| 1,876,171 | Rosener | Sept. 6, 1932 |
| 1,884,861 | Remde | Oct. 25, 1932 |
| 1,903,102 | Farley | Mar. 28, 1933 |
| 1,929,897 | Merritt et al. | Oct. 10, 1933 |
| 2,127,278 | Welch | Aug. 16, 1938 |